(12) United States Patent
van Riel

(10) Patent No.: US 8,856,473 B2
(45) Date of Patent: Oct. 7, 2014

(54) COMPUTER SYSTEM PROTECTION BASED ON VIRTUALIZATION

(75) Inventor: Henri Han van Riel, Nashua, NH (US)

(73) Assignee: Red Hat, Inc., Raleigh, NC (US)

( * ) Notice: Subject to any disclaimer, the term of this patent is extended or adjusted under 35 U.S.C. 154(b) by 1458 days.

(21) Appl. No.: 11/171,457

(22) Filed: Jul. 1, 2005

(65) Prior Publication Data

US 2007/0005919 A1   Jan. 4, 2007

(51) Int. Cl.
*G06F 12/14* (2006.01)
*G06F 21/53* (2013.01)

(52) U.S. Cl.
CPC ........................... *G06F 21/53* (2013.01)
USPC .................... 711/163; 711/E12.091

(58) Field of Classification Search
None
See application file for complete search history.

(56) References Cited

U.S. PATENT DOCUMENTS

| | | | |
|---|---|---|---|
| 5,319,760 A * | 6/1994 | Mason et al. | 711/208 |
| 5,621,912 A | 4/1997 | Borruso et al. | |
| 6,397,242 B1 * | 5/2002 | Devine et al. | 718/1 |
| 6,496,847 B1 | 12/2002 | Bugnion et al. | |
| 6,594,780 B1 | 7/2003 | Shen et al. | |
| 6,986,006 B2 * | 1/2006 | Willman et al. | 711/152 |
| 2003/0061497 A1 * | 3/2003 | Zimmer | 713/189 |
| 2004/0064813 A1 * | 4/2004 | Neiger et al. | 718/1 |
| 2005/0091365 A1 | 4/2005 | Lowell et al. | |
| 2006/0146057 A1 * | 7/2006 | Blythe | 345/506 |

OTHER PUBLICATIONS

Garfinkel at al., "*A Virtual Introspection Based Architecture for Intrusion Detection,*" 16 pages, Stanford University.
Litty, "*Hypervisor-Based Intrusion Detection,*" thesis submitted for MS, University of Toronto, 2005, pp. 1-73.
Matthews et al., "*Data Protection and Rapid Recovery From Attack With a Private File Server,*" 12 Pages.

* cited by examiner

*Primary Examiner* — Christian P Chace
*Assistant Examiner* — Eric Loonan
(74) *Attorney, Agent, or Firm* — Lowenstein Sandler LLP

(57) ABSTRACT

Embodiments of the present invention provide a virtualization protection system (VPS) that leverages virtual machine monitor (VMM) technology. In some embodiments, a computer system contains a host operating system and one or more virtual machines that run on "guest" operating systems. The VPS makes certain areas of memory of the computer system read-only, making it essentially impossible for the virtual machines or other component to compromise the system.

17 Claims, 4 Drawing Sheets

COMPUTER SYSTEM PROTECTION BASED ON VIRTUALIZATION

DESCRIPTION OF THE INVENTION

1. Field of the Invention

The present invention relates generally to the protection of computer systems.

2. Background of the Invention

Today, many computer systems are highly susceptible to attack from viruses, trojan horses, worms, root kits, and the like. Most computer systems implement some form of protective system, such as a virus checker or firewall. Unfortunately, attacks by malicious parties and hackers have become increasingly sophisticated in defeating the known protection systems.

Indeed, some attacks, such as root kits, are virtually impossible to thwart. This is because root kits exploit weaknesses in the operating system, which completely circumvent most known protection systems. For example, known root kits, such as "Adore" and "Knark," allow an attacker to gain root privileges, hide their activities, and gain elevated permissions before the protection system is initiated. Also, many root kits can circumvent known protection systems because they are directly installed into the kernel of an operating system. Therefore, kernel-based root kits can be significantly harder to detect and prevent.

Known protection systems also suffer from other disadvantages. For example, known protection systems often require continuous updating in order to be effective against new forms of attacks. Also, known protection systems may decrease the performance of a computer system.

Therefore, it would be desirable to protect computer systems against increasingly sophisticated attacks and avoid the deficiencies of known protection systems.

SUMMARY OF THE INVENTION

In accordance with one feature of the invention, a method of protecting a computer system is provided. A first operating system is booted with privileged access to the computer system. Access to portions of memory of the computer system by additional operating system is restricted to read-only access. However, unrestricted access to the portions of memory is emulated via the first operating system.

In accordance with another feature of the invention, a method of protecting a computer system is provided. A virtual machine monitor is booted and has privileged access to hardware of the computer system. A guest operating system is booted with a lower privilege of access than the virtual machine monitor. Portions of memory for a kernel of the guest operating system are then marked as read-only.

In accordance with another feature of the invention, a protected computer system comprises a virtual machine monitor, a virtual machine, and a protection system. The virtual machine monitor is configured to virtualize at least a portion of hardware of the computer system. The virtual machine is configured as a client of the virtual machine monitor and runs on a guest operating system. The protection system is coupled to the virtual machine monitor and is configured to prevent write access to areas of memory by a kernel guest operating system running inside the virtual machine.

In accordance with another feature of the invention, a protected computer system comprises at least one virtual machine, a virtual machine monitor, and a memory. The guest operating system runs on the virtual machine. The virtual machine monitor is interposed between the at least one virtual machine and hardware of the computer system. The virtual machine monitor then protects portions of the memory for the kernel of the guest operating system by marking them as read only.

Additional features of the invention will be set forth in part in the description which follows, and in part will be obvious from the description, or may be learned by practice of the invention. It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention provide a virtualization protection system (VPS) that leverages virtual machine monitor (VMM) technology. Since it is based on VMMs, embodiments of the VPS can operate independently of the software and hardware it is monitoring. In some embodiments, a computer system contains a host operating system and one or more "guest" operating systems running in virtual machines. The VPS may run using the host operating system, as part of virtualization software, or as a standalone application. The VPS may protect sensitive areas of memory of the computer system, such as address ranges of memory containing the operating system text, the system call table, and other operating system data, by marking them as read-only. This makes it essentially impossible for the virtual machines, guest operating systems, or other components outside of the VPS to write to sensitive areas of the memory, or otherwise compromise the system.

Reference will now be made in detail to exemplary embodiments of the invention, which are illustrated in the accompanying drawings. Wherever possible, the same reference numbers will be used throughout the drawings to refer to the same or like parts.

Figure 1:
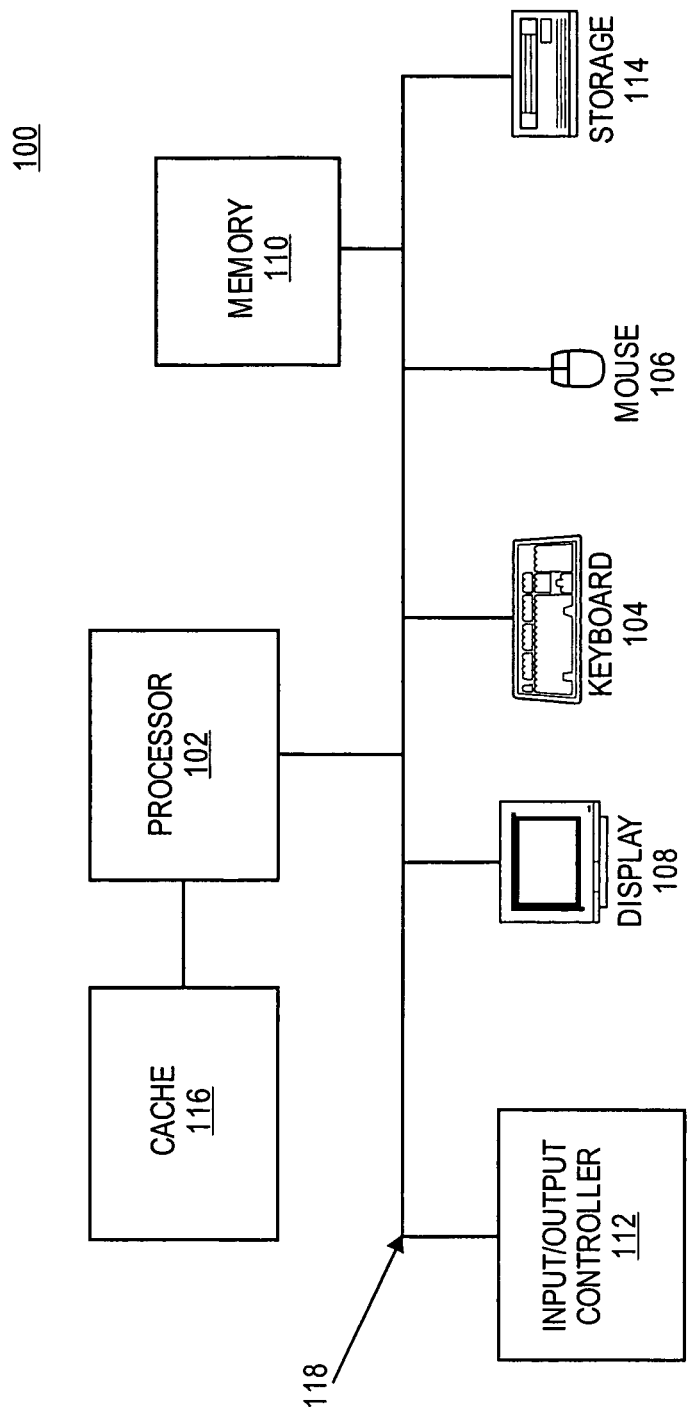
FIG. 1 illustrates a computer system that is consistent with the principles of the present invention.

FIG. 1 illustrates a computer system 100 that is consistent with the principles of the present invention. For purposes of explanation, FIG. 1 illustrates a general purpose computer, such as a personal computer, which may implement embodiments of the present invention. Examples of the components that may be included in computer system 100 will now be described.

As shown, a computer system 100 may include a central processor 102, a keyboard 104, a pointing device 106 (e.g., mouse, or the like), a display 108, a main memory 110, an input/output controller 112, and a storage device 114. Processor 102 may further include a cache memory 116 for storing frequently accessed information. Cache 116 may be an "on-chip" cache or external cache. System 100 may also be provided with additional input/output devices, such as a printer (not shown). The various components of the system 100 communicate through a system bus 118 or similar architecture.

Although FIG. 1 illustrates one example of a computer system, the principles of the present invention are applicable to other types of processors and systems. That is, the present invention may be applied to any device that needs protection. Examples of such devices include laptop computers, servers, handheld devices, and their known equivalents.

Figure 2:
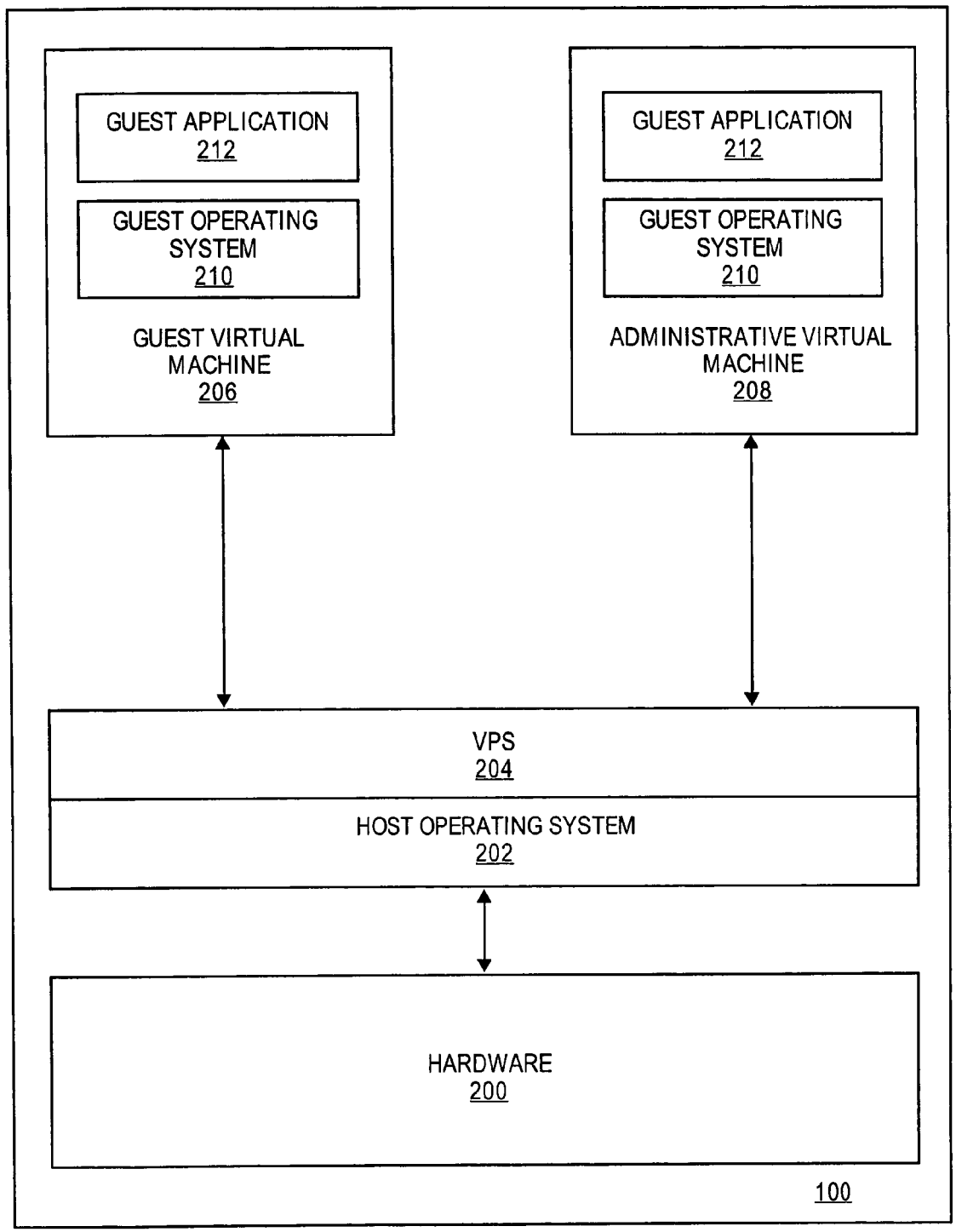
FIG. 2 illustrates an example of a functional block diagram for a system that is consistent with the principles of the present invention.

FIG. 2 illustrates a function block diagram for system 100 that is consistent with the principles of the present invention. As shown, system 100 may comprise hardware 200, a host operating system 202, a VPS 204, a guest virtual machine 206, and an administrator virtual machine 208.

Hardware 200 represents the components of hardware and firmware described above with reference to FIG. 1, such as processor 102 and memory 110. Such hardware and firmware are well known to those skilled in the art.

Host operating system (OS) 202 supports the operation of VPS 204 and provides functionality, such as drivers, basic input/output system code, a file system, and the like. Host OS 202 is an integrated collection of routines that service the sequencing and processing of hardware 200. Host OS 202 may provide many services to VPS 204, such as resource allocation, scheduling, input/output control, and data management. Host OS 202 may be predominantly software, but may also comprise partial or complete hardware implementations and firmware. Well known examples of operating systems that are consistent with the principles of the present invention include LINUX, AIX by IBM, and Sun Solaris by Sun Microsystems. Of course, one skilled in the art will also recognize that host OS 202 may be incorporated into VPS 204.

VPS 204 is the software responsible for protecting system 100. VPS 204 may virtualize hardware 200 and partition system 100 into logically separate virtual machines, such as virtual machines 206 and 208. VPS 204 may include a thin layer of VMM software that runs on host OS 202 and directly accesses hardware 200 of system 100. In other embodiments, VPS 204 includes the functionality of host OS 202, and thus, VPS 204 may operate without host OS 202. Alternatively, VPS 204 may be implemented as a component of the virtualization software.

VPS 204 may provide a virtual machine model that emulates hardware 200. Thus, in some embodiments, VPS 204 may conceal its existence and operations from the other virtual machines or applications running on system 100. VPS 204 may also virtualize various hardware resources and allow multiple virtual machines, such as virtual machines 206 and 208, to transparently multiplex these resources of hardware 200. Virtual machines 206 and 208 will now be further described.

Virtual machine 206 may be referred to as the "guest" virtual machine. As a guest virtual machine, virtual machine 206 may serve as the machine used primarily by the user of system 100. As shown, the operating system running inside of virtual machine 206 is referred to as guest OS 210, and applications running inside of virtual machine 206 are referred to as guest applications 212. Guest OS 210 may be predominantly software, but may also comprise partial or complete hardware implementations and firmware. Well known examples of operating systems that are consistent with the principles of the present invention include Mac OS by Apple Computer, OpenVMS, LINUX, AIX by IBM, Java and Sun Solaris by Sun Microsystems, Windows by Microsoft Corporation, Microsoft Windows CE, Windows NT, Windows 2000, and Windows XP. Although FIG. 2 depicts a single guest virtual machine, one skilled in the art will recognize that system 100 may implement any number of virtual machines.

Virtual machine 208 may be referred to as an administrative virtual machine. In particular, virtual machine 208 may provide certain administrative functions related to protecting system 100, such as logging events, providing remote access, configuration management, and communications. For example, an administrator may have an account on system 100 and have access to administrative virtual machine 208. Hence, the administrator may perform various tasks and functions via administrative virtual machine 208. Such functions are well known to those skilled in the art.

As shown, administrative virtual machine 208 may be similarly structured to guest virtual machine 206. That is, administrative virtual machine 208 may also include a guest OS 210 and guest applications 212. However, in some embodiments, virtual machine 208 may be configured with different applications and may be specially isolated (e.g., concealed) from the other virtual machines due to its administrative roles with VPS 204.

VPS 204 may be privileged code running on system 100. Meanwhile, guest virtual machine 206 may be accorded a lower privileged access to system 100. In addition, VPS 204 may isolate the operations of the virtual machines on system 100 from each other and from directly affecting hardware 200. Therefore, in this architecture, VPS 204 can always confine guest virtual machine 206 even if that virtual machine has been compromised by malicious code, such as a virus or root kit.

For example, in some embodiments, VPS 204 may virtualize memory 110 by emulating a memory management unit (MMU) for each virtual machine. VPS 204 may also emulate an address space of memory 110 (e.g., a virtual address space) that each virtual machine fully controls. Hence, guest virtual machine 206 is still provided its own address space that it believes it fully controls, but which is a virtual address space that is under the control of VPS 204. Accordingly, guest virtual machine 206 may be rendered unaware of the existence of VPS 204. However, VPS 204 may retain control of the real MMU (not shown) of memory 110 of system 100. In some embodiments, VPS 204 may map memory 110 into non-overlapping address spaces for the virtual address spaces so that the virtual machines in system 100 do not share any portion of memory 110 with each other, or with VPS 204. Therefore, VPS 204 and virtual machines 206 and 208 may be isolated from each other.

In some embodiments, VPS 204 marks various portions of memory 110 as read-only automatically, without the knowledge of any of guest operating systems 210. Hence, guest operating systems 210 may still believe that they have full or unrestricted access to memory 110 based on the virtual view of hardware 200 provided by VPS 204. However, real access to memory 110 may still be controlled by VPS 204. In some embodiments, during the early stages of boot up of system 100, VPS 204 may be started up first and mark the desired portions of memory 110 as read-only, such as portions of memory associated with the kernel of guest operating systems 210. VPS 204 may use direct memory access (DMA) protection to protect kernel memory from being modified. Meanwhile, VPS 204 may present a virtual view of memory 110 to guest operating system 210 using virtual addresses to conceal its existence or the protections on memory 110. VPS 204 may also protect or shadow the page tables mapping memory 110. This prevents, for example, a compromised guest virtual machine 206 from using its system call table for unauthorized purposes, such as circumventing the protections put in place by VPS 204.

Alternatively, in some embodiments, guest OS 210 may be made aware of VPS 204 and cooperate with VPS 204. For example, guest OS 210 may specify which portions of memory 110 need to be protected. In particular, guest OS 210 may identify various address ranges of memory that are considered sensitive. VPS 204 may then virtualize these areas of memory 110 by irreversibly marking them read-only. VPS 204 may also protect page tables in addition to the protected memory itself. Guest OS 210 and VPS 204 may perform these actions during the early stages of boot up for virtual machine 206.

VPS 204 may have access to all aspects of virtual machines 206 and 208, such as CPU state (e.g. registers), all memory, and all I/O device state such as the contents of storage devices and register state of I/O controllers. VPS 204 may also intercept all input/output requests to hardware 200 from virtual machines 206 and 208 and map them to the correct device in hardware 200. In some embodiments, VPS 204 may be configured to virtualize some or all of hardware 200, such as CPU 102 and memory 110, depending upon the extent to which it must access virtual machines in system 100.

In some embodiments, attempts by virtual machines to access privileged operations trap into VPS 204. For example, if virtual machine 206 attempts to write to a sensitive area of memory 110 or a particular register of CPU 102, then VPS 204 may trap this operation and take certain protective actions. Trapping hardware events, such as interrupts and memory accesses, can affect the performance of system 100. Accordingly, VPS 204 may be configured to only trap events that indicate definite misuse, such as attempts at modifying sensitive memory that should never change at runtime.

This architecture may render system 100 difficult or essentially impossible for an attacker to compromise virtual machine 206 or system 100 even if guest application 212 has been compromised and there is a security problem in guest OS 210. For example, even if an attacker is able to compromise virtual machine 206, the operations of virtual machine 206 can still be constrained by VPS 204. In addition, VPS 204 may be implemented using relatively simple software that is difficult for an attacker to expose. For example, the interfaces between VPS 204 and the other components of system 100 may be significantly simpler and more constrained than that of guest virtual machine 206. In some embodiments, VPS 204 may use an interprocess communication (IPC) mechanism rather than internal hooks. Also, VPS 204 may load various portions of its software as a shared library. Therefore, system 100 can be protected by VPS 204 from attacks based on relatively simple policies.

If an attack or unusual event is detected by VPS 204, it may perform various protective actions. For example, VPS 204 may raise warnings to an administrator of system 100 when an attempt has been made to write to a protected area of memory 110. The warning may also identify files that changed, but should not have changed. VPS 204 may then copy and save the changed (compromised) files in storage 114 for later analysis. This warning may be a message displayed at system 100 or sent to another system across a network, such as the Internet. In some embodiments, VPS 204 may further provide a warning to virtual machine 206. VPS 204 may also command administrative virtual machine 208 to log or record the operational state of virtual machine 206 when an attack has been detected.

In order to assist VPS 204, administrative virtual machine 208 may periodically record checkpoints of guest virtual machine 206. VPS 204 may also archive an image of guest OS 210 by marking disk blocks in storage 114 as read-only. Thus, when an attack has been detected or suspected, VPS 204 may verify that the current image of guest OS 210 in storage 114 matches the archived image. Alternatively, VPS 204 may verify the integrity of guest OS 210 by checking for a signature, such as a cryptographically protected signature, by the software supplier. If needed, guest virtual machine 206 may then be restored to a known or safe operating state. The data recorded by administrative machine 208 may also be used to perform analysis of guest virtual machine 206.

In other instances, VPS 204 may automatically terminate and/or reboot guest OS 210 when an attack is suspected or detected. For example, VPS 204 may perform these action when a protected area of memory 110 is accessed by a root kit during boot up of guest OS 210. On such an automatic termination of guest OS 210, VPS 204 may then verify the contents of the virtual machine, such as virtual machine 206, and perform a virus check. Some the components of VPS 204 used to perform these functions will now be described.

Figure 3:
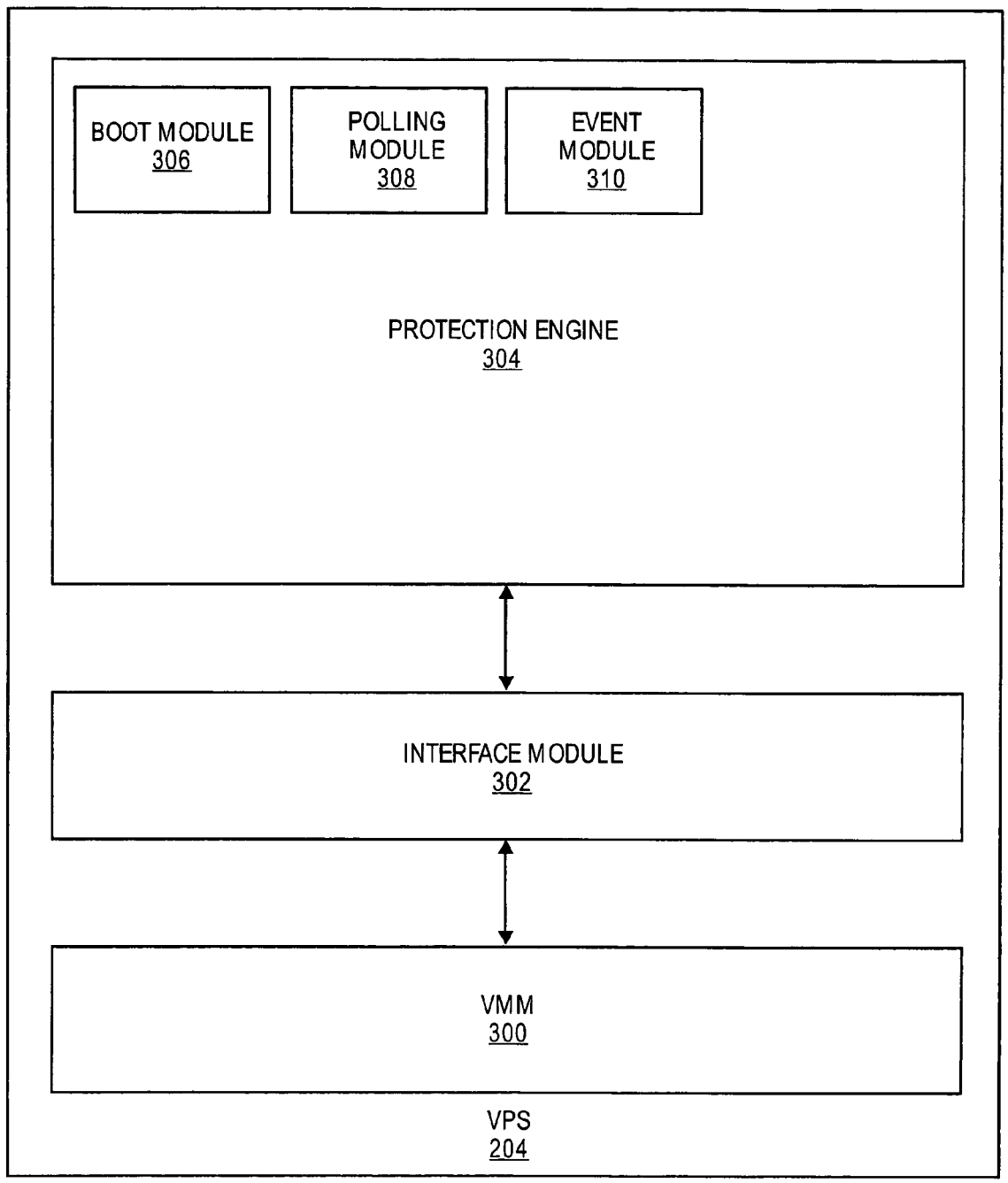
FIG. 3 shows an exemplary virtualization protection system that is consistent with the principles of the present invention.

Referring now to FIG. 3, a functional block diagram of VPS 204 is shown. In particular, VPS 204 may comprise a VMM 300, an interface module 302, and a protection engine 304. These components may be implemented as software, firmware, or some combination of both, which is stored in memory 110 of system 100 and invoked upon boot up of system 100. The software components may be written in a variety of programming languages, such as C, Cow, Java, etc. Each of these components may run in its own process in host operating system 202. Each of these components will now be discussed in turn.

VMM 300 is the software responsible for virtualizing hardware 200 and partitioning system 100 into logically separate virtual machines, such as virtual machines 206 and 208. VMM 300 may be a thin layer of software that runs on host OS 202 and directly accesses hardware 200. As noted, VMM 300 may virtualize various hardware resources and allow multiple virtual machines, such as virtual machines 206 and 208, to transparently multiplex the resources of hardware 200. For example, VMM 300 may be given access any page of memory 110 or disk block in storage 114.

Interface module 302 is responsible for tracking the operational status of the virtual machines running on system 100. For example, interface module 302 may directly examine virtual machines 206 and 208 for information, such as memory and register contents, and I/O device flags. Other parameters that interface module 302 may track include: all the processes currently running on system 100; processes which are currently holding sockets; contents of virtual memory; and contents of the task structure for a particular process.

Interface module 302 may also monitor for certain events and request notification from the virtual machines running on system 100. For example, interface module 302 may be notified when a certain range of memory 110 changes, a privileged register changes, or a device state change occurs (such as when a network interface address changes in I/O controller 112).

Furthermore, interface module 302 may control the execution of the virtual machines, such as virtual machines 206 and 208. For example, interface module 302 may suspend a virtual machine's execution, resume a suspended virtual machine, record a checkpoint for the state of a virtual machine, and reboot a virtual machine.

Interface module 302 may also be configured to account for variations in the different guest operating systems installed on system 100. Such differences may relate to differences in versions, patches installed, and the like. Accordingly, interface module 302 may include various interface libraries that are matched to guest OS 210, and thus, different guest operating systems may have different interface libraries. An interface library may be in the form of a well known data structure that specifies the data formats and protocols used by the guest operating systems. The interface library may also include information about the current kernel, device drivers, etc. of a guest operating system, such as guest operating system 210.

Protection engine 304 is responsible for implementing the rules and policies for protecting system 100. In particular, protection engine 304 may interpret the operational status presented by interface module 302 and determine whether or not system 100 has been compromised or is under attack. If system 100 has been compromised or is under attack, protection engine 304 may operate with interface module 302 to respond in an appropriate manner. For example, protection engine 304 can order the suspension or reboot of virtual machine 206, and report this event to an administrator. In some embodiments, when an event occurs, protection engine 304 may automatically suspend a virtual machine. Of course, in other scenarios, such as minor anomalies, protection engine 304 may allow a virtual machine to continue its operations, but order interface module 302 to begin heightened scrutiny of that virtual machine.

As shown in FIG. 3, protection engine 304 may further comprise a boot module 306, a polling module 308, and an event module 310. These modules may be implemented as modules of program code that run alone or in concert with each other. One skilled in the art will recognize that these modules are merely exemplary and that other types of modules are consistent with the principles of the present invention. These modules and their functions will now be further discussed.

Boot module 306 is responsible for the start up of VPS 204. For example, boot module 306 may coordinate with host operating system 202 to load the various interface libraries, and load the other modules into protection engine 304.

Polling module 308 periodically checks the operational state of system 100 and attempts to detect when system 100 has been compromised or is under attack. Polling module 308 may poll for various parameters at different intervals depending on the nature of the parameter. Polling module 308 may also poll system 100 to thwart the various tactics used to attack system 100. For example, in many instances, an attacker may attempt to hide their activities on system 100 by modifying a shared library or kernel of guest OS 210. However, these modifications can lead to inconsistencies between the kernel, or hardware view of system 100, and the information provided by virtual machine 206 to polling module 308. Accordingly, polling module 308 may be configured to directly inspect hardware 200, memory 110, kernel state of guest operating system 212, etc. If polling module 308 detects an inconsistency, it may then report this event to event module 310. Protection engine 304 may then take further action depending upon the decision of event module 310.

One skilled in the art will recognize that polling module 308 may support the collection of virtually any operational information. For example, polling module 308 may be configured to monitor all system calls. Polling module 308 may check operational state information by using various techniques. For example, polling module 308 may use well known programs, such as "ipconfig," to collect its information. As another example, polling module 308 may compare sections of a running program and compare it to a known reference. Polling module 308 may also scan for known patterns associated with malicious program code or attacks. Polling module 308 may also periodically query virtual machine 206 for all the sockets held by user processes to detect network access attacks.

Event module 310 is responsible for responding when polling module 308 or protection engine 304 detects that system 100 has been compromised or is under attack. One such event is when a write to a sensitive location in memory 110 has been requested by virtual machine 206.

In some embodiments, event module 310 may provide polling module 308 and interface module 302 the events it would like to be notified. When one of these events occurs, event module 310 may simply record and report the event, for example, to administrative virtual machine 208. Event module 310 may also command that the violating virtual machine, such as guest virtual machine 208 be suspended. Of course in severe circumstances where system 100 has been extensively compromised, event module 310 may shut down a virtual machine, switch system 100 to a safe mode of operation, or shut down system 100 itself. One skilled in the art will recognize that other types of actions may be performed to protect system 100. For example, if protection engine 304 crashes, VMM 300 may be configured by event module 310 to continue protecting various interfaces to hardware 200.

In some embodiments, event module 310 is configured to suspend the operation of a virtual machine when a sensitive area of memory 110 is accessed, such as system call tables and sections containing operating system code. Event module 310 may also be configured to prevent I/O controller 112 from taking certain actions. For example, event module 310 may prevent virtual machine 206 from changing an address in I/O controller 112.

Figure 4:
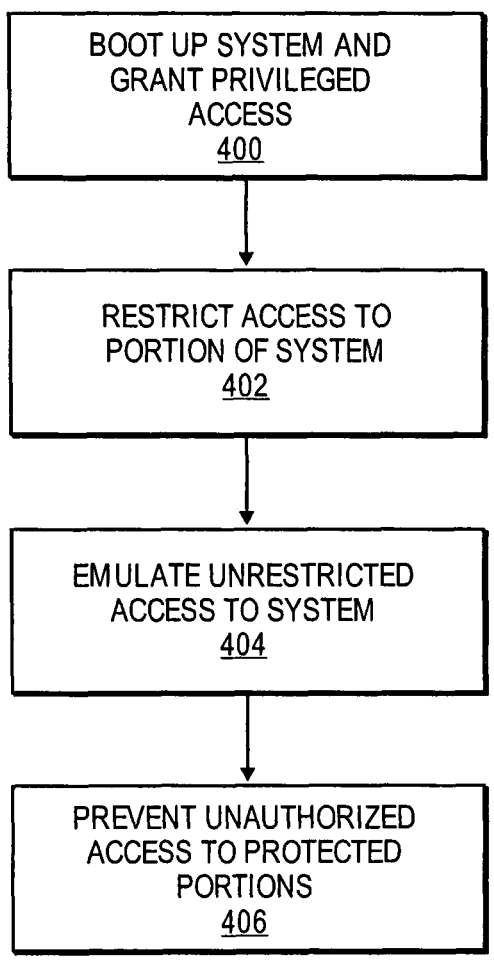
FIG. 4 shows an exemplary process for protecting a system that is consistent with the principles of the present invention.

FIG. 4 shows an exemplary process for protecting a system that is consistent with the principles of the present invention. In stage 400, system 100 is booted up and grants privileged access. For example, when system 100 is booting up, it may grant privileged access to host OS 202. With privileged access, host OS 202 may then directly access hardware 200 and allocate the resources of the hardware 200, such as memory 110. VPS 204 may then be configured to startup shortly after host OS 202 has completed its startup.

Alternatively, system 100 may be booted up and, as part of its startup process, may grant privileged access to a virtual machine monitor, such as VPS 204. For example, VPS 204 may incorporate some or all of the functionality of an operating system. One skilled in the art will recognize that the boot up of system 100 may be performed in various ways that are still consistent with the principles of the present invention. Processing may then flow to stage 402.

In stage 402, various portions of system 100 are protected. For example, VPS 204 may utilize its privileged access and mark various portions of memory 110 as read only. In some embodiments, VPS 204 may be configured to mark portions of memory 110 that are associated with the kernel of guest operating systems 210. VPS 204 may also use direct memory access (DMA) protection to protect kernel memory in memory 110 from being modified. As another example, VPS 204 may protect or shadow the page tables used for mapping memory 110. This prevents, for example, a compromised guest virtual machine 206 from circumventing VPS 204. VPS 204 may further protect system 100 by mapping memory 110 into non-overlapping address spaces for the virtual address spaces so that the virtual machines in system 100 do not share any portion of memory 110 with each other, or with VPS 204. Other protections noted above may also be put in place by VPS 204. Processing may then flow to stage 404.

In stage 404, once the protections for system 100 have been put in place, system 100 may boot up the other operating systems, such as guest operating system 210, but with a less privileged access than host OS 202 or VPS 204. Accordingly, the other operating systems may be restricted from accessing or modifying the portions of system 100 that are protected by VPS 204. However, VPS 204 may leverage its privileged access to emulate hardware 200 and provide guest operating systems 210 a virtual view that appears to grant unrestricted or normal access. VPS 204 may be configured to virtualize some or all of hardware 200, such as CPU 102 and memory 110, depending upon the extent to which it must access virtual machines in system 100. VPS 204 may have access to all aspects of virtual machines 206 and 208, such as CPU state (e.g. registers), all memory, and all I/O device state such as the contents of storage devices and register state of I/O controllers. VPS 204 may also intercept all input/output requests to hardware 200 from virtual machines 206 and 208 and map them to the correct device in hardware 200.

As noted, in some embodiments, VPS 204 may mark various portions of memory 110 as read-only automatically. When booted up, guest operating systems 210 may be unaware of the protections put in place by VPS 204, because VPS 204 may emulate memory 110 such that guest operating systems 210 are presented a full or unrestricted virtual access to memory 110. Real access, such as write access, to memory 110 is still controlled by VPS 204.

In some embodiments, VPS 204 may use virtual addresses that are mapped to hardware 200 to conceal its existence. Alternatively, in some embodiments, guest OS 210 may be made aware of VPS 204. In these embodiments, guest OS 210 may then cooperate with VPS 204. For example, guest OS 210 may specify which portions of memory 110 need to be protected. Guest OS 210 may identify various address ranges of memory that are considered sensitive. VPS 204 may then virtualize these areas of memory 110 by irreversibly marking them read-only. VPS 204 may also protect page tables in addition to the protected memory itself. Guest OS 210 and VPS 204 may perform these actions during the early stages of boot up for virtual machine 206 or system 100. Processing may then flow to stage 406.

In stage 406, system 100 is permitted to continue with its operations, but is protected by VPS 204. Fore example, in some embodiments, attempts by virtual machines to access privileged operations trap into VPS 204. For example, if virtual machine 206 attempts to write to a sensitive area of memory 110 or a particular register of CPU 102, then VPS 204 may trap this operation and take certain protective actions. Trapping hardware events, such as interrupts and memory accesses, can affect the performance of system 100. Accordingly, VPS 204 may be configured to only trap events that indicate definite misuse, such as attempts at modifying sensitive memory that should never change at runtime.

The interfaces between VPS 204 and the other components of system 100 may be significantly simpler and more constrained than that of guest virtual machine 206. In some embodiments, VPS 204 may use an interprocess communication (IPC) mechanism rather than internal hooks. Also, VPS 204 may load various portions of its software as a shared library. Therefore, system 100 can be protected by VPS 204 from attacks based on relatively simple policies.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of protecting a computer system, said method comprising:
   running an additional operating system on a virtual machine hosted by a first operating system having privileged access to the computer system, wherein the additional operating system has a lower access privilege to the computer system than the first operating system;
   preventing, by the first operating system, the additional operating system from writing to restricted portions of a memory of the computer system, wherein the restricted portions of the memory include a kernel of the additional operating system;
   detecting an attempt by the additional operating system or an application to write to the restricted portions of the memory, wherein the application runs inside the virtual machine and has privileged access to the virtual machine; and
   providing a warning when the attempt to write to the restricted portions of the memory has been detected, wherein
   preventing the additional operating system from writing to the restricted portions of the memory does not prevent the first operating system from writing to the restricted portions of the memory.

2. The method of claim 1, wherein preventing the additional operating system from writing to the restricted portions of memory comprises marking the memory read-only automatically without notifying the additional operating system.

3. The method of claim 1, wherein preventing the additional operating system from writing to the restricted portions of the memory comprises preventing the additional operating system from writing to page tables.

4. The method of claim 1, wherein preventing the additional operating system from writing to restricted portions of the memory comprises preventing the additional operating system from writing to restricted portions of the memory that are identified by the additional operating system.

5. The method of claim 1, wherein preventing the additional operating system from writing to restricted portions of the memory comprises preventing the additional operating system from writing to a set of virtual addresses of the memory.

6. The method of claim 1, further comprising:
   suspending the additional operating system when the attempt to write to the restricted portions of the memory has been detected.

7. The method of claim 1, further comprising:
   emulating, by the first operating system, unrestricted access for the additional operating system to the restricted portions of the memory.

8. A method of protecting a computer system having a memory, said method comprising:
   running a guest operating system on a virtual machine, wherein the virtual machine is hosted by a virtual machine monitor having privileged access to hardware of the computer system, and the guest operating system has a lower privilege of access to the hardware than the virtual machine monitor;
   marking, by the virtual machine monitor, portions of the memory containing a kernel of the guest operating system as read-only for the guest operating system; and
   preventing the guest operating system from writing to the marked portions of the memory without preventing the virtual machine monitor from writing to the marked portions of the memory.

9. The method of claim 8, further comprising:
allocating an address space of the memory for the guest operating system; and
providing a virtual address space to the guest operating system that is based on the address space.

10. The method of claim 8, further comprising:
concealing the virtual machine monitor from the guest operating system.

11. A protected computer system, comprising:
a computer system having a memory;
a virtual machine monitor configured to virtualize at least a portion of hardware of the computer system to be protected;
a virtual machine configured as a client of the virtual machine monitor and configured to run on the virtualized portion of hardware, wherein a guest operating system runs inside the virtual machine; and
a protection system coupled to the virtual machine monitor and configured to prevent the guest operating system but not the virtual machine monitor from writing to a protected area of the memory occupied by a kernel of the guest operating system.

12. The system of claim 11, wherein the virtual machine monitor is configured to provide a virtual address space that emulates the memory of the protected computer system for the virtual machine.

13. The system of claim 11, wherein the protection system is configured to prevent the virtual machine from writing to the protected area of the memory.

14. The system of claim 11, wherein the protection system is configured to prevent an application running inside the virtual machine from writing to the protected area of the memory.

15. The system of claim 11, wherein the protection system is configured to conceal itself from the virtual machine.

16. A protected computer system, comprising:
at least one guest operating system running inside a virtual machine;
a virtual machine monitor that is interposed between the virtual machine and hardware of the computer system;
a memory having protected portions that contain a kernel of the guest operating system marked by the virtual machine monitor as read only for the guest operating system, wherein the virtual machine monitor emulates unrestricted access for the guest operating system to the protected portions; and
a protection system coupled to the virtual machine monitor that prevents the guest operating system from writing to the protected portions of the memory without preventing the virtual machine monitor from writing to the protected portions of the memory.

17. The system of claim 16, wherein the protection system traps requests by the guest operating system to write to the protected portions of the memory.

\* \* \* \* \*